Patented Apr. 6, 1948

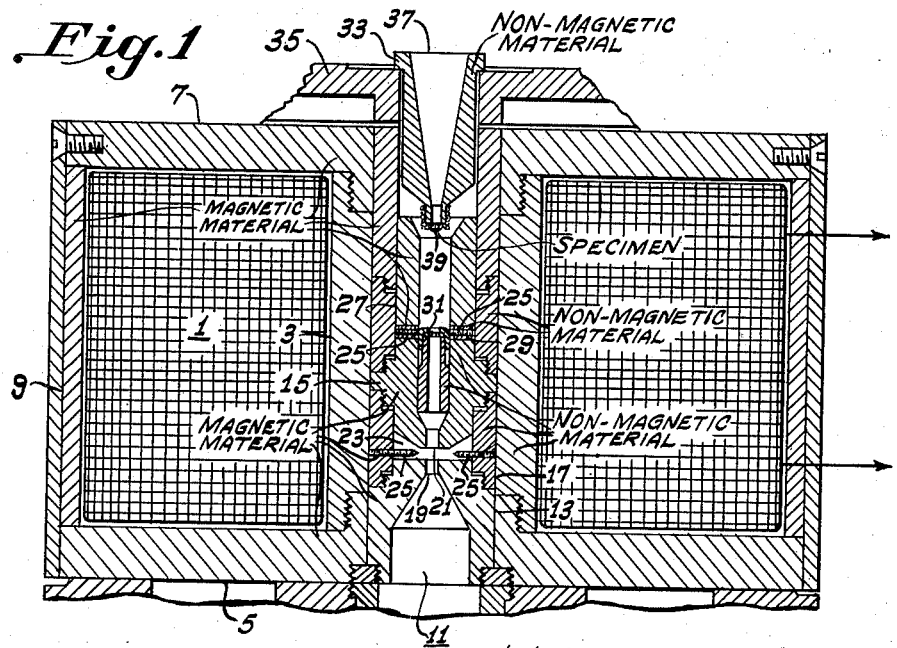

2,438,971

UNITED STATES PATENT OFFICE 2,438,971

COMPOUND ELECTRON OBJECTIVE LENS

James Hillier, Cranbury, N. J., assignor to Radio Corporation of America, a corporation of Delaware Application October 31, 1946, Serial No. 706,901

17 Claims. (Cl. 250—49.5)

This invention relates generally to electron optical apparatus and more particularly to compound electromagnetic and electrostatic electron objective lenses for electron microscopes and the like.

Electron microscope objective lenses have been found to provide best resolving power when operated at their minimum focal lengths. However, at such high resolving powers, lack of contrast in the image formed by the lens is a limiting factor, and requires the use of angular lens apertures approaching the optimum value of approximately $5 \times 10^{-3}$ radians if uniformly good results are to be obtained for a wide variety of specimens. Such an angular aperture requires a physical aperture of only .0004 inch. The extreme difficulty of producing such a small physical aperture, and the fact that a hole of this size through a relatively thick metallic foil introduces its own aberrations in the electron images, has led to the use of electron objective lenses without a limiting aperture or with an aperture which is many times the theoretical desired value.

Another limitation on the operation of the conventional high power objective is that its magnification is approximately 100X, while the lowest overall magnification obtainable in the entire electron microscope when employed in combination with the projection lens is of the order of 7000X. It is frequently desirable to utilize an overall magnification of the order of 1000X for surveying microspecimens prior to more detailed examination at very much higher magnifications. In existing microscope systems, rough surveying at relatively low magnifications may not be achieved without changing either the objective or projection lens systems or without disturbing the adjustment of the instrument and/or the positioning of the specimen with respect to the objective lens.

A third limitation of conventional electron microscope objective lenses is that the high powered objective pole pieces employed therein require extremely small aperture size, and if operated at the maximum power, the specimen must be located extremely close to the central transverse plane of the lens. This condition requires that the specimen support must be extremely small and difficult to handle. Another requirement is that the specimen stage and specimen cartridge must be long and narrow in order to extend into the lens pole pieces to a point closely adjacent to the central lens plane, thereby making the specimen stage and specimen support extremely susceptible to vibration.

The instant invention overcomes all of these difficulties simultaneously. In a preferred embodiment thereof, it comprises a double gap electromagnetic objective lens structure comprising a weak first lens and a strong second lens. The first lens produces an image of the specimen at unity magnification in the object plane of the second lens. The second lens is a strong lens of the type ordinarily employed in conventional electron microscope objectives. The lenses comprise the fields in two separate air gaps in series with a magnetic circuit energized from separate lens windings, or from a single winding. The double lens system permits the specimen to be located approximately ten times further from the object plane of the high power lens, and at a distance of the order of five times greater from the central plane of the weak lens than would be possible with a single high power lens.

The fact that the specimen may be located at a point well outside of the relatively small bore central portions of the lenses permits the use of greatly simplified and much more rigid specimen supports than are feasible in conventional microscopes. Also relatively large physical apertures may be employed in both of the lenses to obtain the desired small angular aperture. Furthermore, the physical apertures and effective angular apertures of the two lenses are substantially equal. The double-lens objective system has an additional advantage in that it provides focused electron images of the specimen for two values of the exciting current in the lens winding, whereby a single adjustment of lens current may provide a magnification change of the order of 10 to 1. The overall maximum magnification of the compound objective lens may be of the order of 100X as in conventional electron objective lens systems.

The image produced by the weak lens at unity magnification is focused on the optimum object plane of the second lens. Because of the long working distance between the specimen and the central plane of the weak lens, the physical apertures required to achieve the desired small angular aperture in the operation of the lens are correspondingly larger, and may be of the order of .004 inch. Since such apertures may be readily and accurately provided in extremely thin foils, the aberrations due to the presence of a relatively small aperture are minimized.

In operating the compound electromagnetic or electrostatic lenses in the region of their lower magnification range limits, the coil currents or lens voltages, respectively, are adjusted for a value for which the virtual image produced above the specimen by the first lens falls in the object plane (also above the specimen) of the second lens. This provides an intermediate image magnified of the order of 3X to 10X which may then be additionally magnified by the projection lens to provide a final screen image at magnifications of the order of 300X to 1000X. However, if the compound objective is operated at a coil current or lens electrode voltage for which the first weak lens forms a real image at approximately unity magnification in the object plane of the second lens, the second lens provides an intermediate image magnified the order of 100X as with a conventional microscope objective. The intermediate image may then be magnified to any desired extent by the microscope projection lens, and may then be projected on an image screen. The actual position of the images within the compound lens may be adjusted by varying the length of the air gap, and hence the strength, of the first lens. In this manner the position of the real image to be magnified by the second powerful lens element of the structure may be determined for operating the second lens under optimum conditions.

Among the objects of the invention are to provide an improved method of and means for imaging microspecimens in an electron optical system. Another object is to provide an improved electron objective lens of high magnification. An additional object is to provide a compound electron objective lens having a wide useful magnification range. A further object is to provide an improved electron objective lens of high magnification wherein a specimen to be imaged may be located at a relatively long distance from the object plane of the high power lens. A still further object of the invention is to provide an improved electron microscope objective comprising a unity power lens located between a microspecimen and a relatively high power lens for imaging the specimen at the object plane of the high power lens. Another object of the invention is to provide a novel high power electron objective lens having a relatively large physical aperture for an optimum value of angular aperture. A still further object of the invention is to provide an improved electron objective lens for imaging a microspecimen wherein the specimen support may be relatively large and rigid and disposed at a relatively great distance from the object plane of a high magnification lens element. Another object of the invention is to provide an improved compound electron objective lens comprising a pair of electromagnetic or electrostatic lens elements of different magnification energized from a separate or common energizing source.

The invention will be described in further detail by reference to the accompanying drawing of which Figure 1 thereof is a cross-sectional elevational view of a first embodiment of the invention, and Figure 2 is a cross-sectional elevational view of a second embodiment of the invention.

In the first embodiment of the invention which has been selected for purposes of illustration, a novel, double-lens, pole piece unit has been substituted for the single objective pole piece unit in a conventional electron microscope electromagnetic lens of the type employed in the RCA type EMU electron microscope. The basic electromagnetic structure and winding, as well as the conformation of the high power lens portion of the unit are conventional. The novel, double-lens pole piece assembly includes an adjustable, substantially unity power upper lens portion, and is adapted to receive a short, rigid, cylindrical specimen holder for supporting a microspecimen at the object plane above the unity power lens.

A common lens winding 1 is wound upon a spool 3, of brass or other non-magnetic material, and the lens winding is surrounded by annular members 5 and 7 and a cylindrical circumferential member 9, both of soft magnetic material. The central aperture through the annular members 5, 7 and through the non-magnetic spool 3 is machined to provide a snug fit with the outer surface of the pole piece assembly 11. The pole piece assembly 11 includes a pair of high power, soft magnetic pole pieces 13, 15, separated by a non-magnetic annular spacer 17. The pole pieces 13 and 15 include central apertures 19, 21 for passage of the electron beam through the lens. The air gap 23 between the pole pieces 13, 15 may be adjusted by substituting non-magnetic spacing elements 17 of different thickness. Assymetries in either, or both, of the double lenses may be corrected by a plurality of radially adjustable correcting screws 25, as described and claimed in applicant's copending application, Ser. No. 671,184 filed May 21, 1946.

The upper portion of the pole piece 15 forms the lower half of a second low power lens which includes a third pole piece 27. The spacing between the second and third pole pieces 15, 27 is established by a second annular non-magnetic spacer 29. A limiting aperture 31 is inserted within the second pole piece 15 to limit the angular aperture of the low power lens.

A short, light, rigid, cylindrical specimen holder 33, inserted within a specimen stage 35 and extending into the upper portion of the central aperture of the lens pole piece assembly, includes a tapered central aperture 37 terminated by a specimen support 39. The specimen support 39 is located at the entrance aperture of the third pole piece 27 to support the specimen at the object plane of the low power lens provided by the second and third pole pieces 15, 27. The specimen is imaged, at substantially unity magnification, by the low power lens substantially at the optimum object plane of the short focal length, high power, lower lens provided between the pole pieces 13, 15, whence the unity magnification image of the specimen is greatly magnified by the lower lens.

The air gap determined by the second non-magnetic spacer 29 between the second and third lens pole pieces 15, 27 is adjustable by the substitution of spacers of different thickness. As explained heretofore, once the lens air gaps are established to provide the desired limits of magnification, the overall magnification of the compound objective lens system may be adjusted to either of two widely different values by variation of the energizing current through the common winding 1.

The instant invention distinguishes from the combined objective and projection lens disclosed and claimed in applicant's Patent 2,369,782, granted February 20, 1946, in that the patented device utilizes an objective of conventional design wherein the specimen must be located extremely close to the objective lens central plane, and wherein the physical lens aperture must be extremely small to provide maximum resolution. In the instant invention the combination of a weak lens and a high power lens in a unitary objective lens assembly permits the wide separation of the specimen and the high power lens portion, as described heretofore, and facilitates rigidly supporting and adjusting of the specimen. The improved lens disclosed and claimed herein also provides means for selectively utilizing both high and low values of magnification in the objective lens without disturbing or adjusting the physical proportions of the lens assembly.

Figure 2 shows a second embodiment of the invention wherein separate energizing windings 1 and 1' are employed for energizing separately and independently the unity power and high power magnetic lenses comprising the pole pieces 27, 15 and 15, 13, respectively. The soft magnetic element 41 is common to the magnetic fields of both lenses. The windings 1 and 1' are energized from a common source through separate current control resistors 43, 45, respectively. By utilizing separately excited magnetic lenses, the overall magnification of the combination may be adjusted continuously from approximately zero to 100 or more. The focused image derived from the compound objective may then be further magnified by a conventional projection lens.

It should be understood that the compound lens may be of electrostatic type energized from separately or commonly controlled voltage sources. The structure of such a compound electrostatic lens would be in accordance with known electrostatic lens technique, and the pole piece separation and energizing voltages for each of the two lens elements would be selected to provide the desired ratio of magnification in the two lens components as described in detail heretofore with respect to the electromagnetic embodiments of the invention.

Thus the invention disclosed comprises a compound objective lens having a wide useful range of magnification wherein the microspecimen in an electron microscope may be located at a point widely separated from the central plane of a high power objective lens element and wherein relatively large physical lens apertures may be employed to provide high resolution images.

I claim as my invention:

1. The method of providing a highly magnified image of a microspecimen comprising imaging said specimen at substantially unity magnification, providing an enlarged image of said unity magnification image of said specimen, effectively equally aperturing both of said images and controlling the magnification of both of said images to provide a focused highly magnified image of said specimen.

2. The method of providing a highly magnified image of a microspecimen comprising imaging said specimen at substantially unity magnification, providing an enlarged image of said unity magnification image of said specimen, effectively equally aperturing both of said images, and simultaneously controlling the magnification of both of said images to provide a focused highly magnified image of said specimen.

3. The method of providing a highly magnified image of a microspecimen comprising imaging said specimen at substantially unity magnification, providing an enlarged image of said unity magnification image of said specimen, effectively equally aperturing both of said images, and separately and independently controlling the magnification of both of said images to provide a focused highly magnified image of said specimen.

4. The method of providing a highly magnified image of a microspecimen comprising establishing an energizing lens field, utilizing a first portion of said field for imaging said specimen at substantially unity magnification, utilizing a second portion of said field having the same effective lens aperture as said first portion of said field for providing an enlarged image of said unity magnification image of said specimen, and controlling the magnification of both of said images as a function of the strength of said field.

5. The method of providing a highly magnified image of a microspecimen comprising establishing a magnetic field, utilizing a first portion of said field for imaging said specimen at substantially unity magnification, utilizing a second portion of said field in series with and having the same effective lens aperture as said first portion for providing an enlarged image of said unity magnification image of said specimen, and simultaneously controlling in the same sense the magnification of both of said images as a function of the strength of said magnetic field.

6. An electron lens objective system for providing highly magnified images of a microspecimen comprising a first electromagnetic lens of relatively high magnification and relatively short focal length, a microspecimen, a second electromagnetic lens of substantially unity magnification and relatively long focal length disposed on the axis of said first lens between said microspecimen and the plane of said first lens to focus said microspecimen substantially at the object plane of said first lens, said lenses having substantially the same effective aperture, and means for simultaneously energizing said first and second lenses.

7. An electron lens objective system for providing highly magnified images of a microspecimen comprising a first electromagnetic lens of relatively high magnification and relatively short focal length, a microspecimen, a second electromagnetic lens of substantially unity magnification and relatively long focal length disposed on the axis of said first lens between said microspecimen and the plane of said first lens to focus said microspecimen substantially at the object plane of said first lens, said lenses having substantially the same effective aperture, and means for independently energizing said first and second lenses.

8. An electron lens objective system for providing highly magnified images of a microspecimen comprising a first electromagnetic lens of relatively high magnification and relatively short focal length, means for supporting a microspecimen, a second electromagnetic lens of substantially unity magnification and relatively long focal length disposed on the axis of said first lens between said microspecimen and the plane of said first lens to focus said microspecimen substantially at the object plane of said first lens, said lenses having substantially the same effective aperture, and means for energizing said first and second lenses.

9. A compound electron objective lens comprising a pair of axially aligned magnetic lenses having a common energizing winding and a common magnetic structure, the power of the first of said lenses being substantially unity and the power of the second of said lenses being substantially greater than unity, said lenses having substantially the same effective aperture, and means for supporting a microspecimen substantially at the object plane of said first lens to provide an enlarged image of said specimen from said second lens, said specimen being disposed a plurality of focal lengths of said second lens from the object plane of said second lens.

10. A compound electron objective lens comprising a pair of axially aligned serially energized magnetic lenses having a common energizing winding and a common magnetic structure, the power of the first of said lenses being substantially unity and the power of the second of said lenses being substantially greater than unity, the focal length of said first lens substantially exceeding the focal length of said second lens, and said lenses having substantially the same effective aperture, and means for supporting a microspecimen substantially at the object plane of said first lens to provide an enlarged image of said specimen from said second lens, said specimen being disposed a plurality of focal lengths of said second lens from the object plane of said second lens.

11. A compound electron objective lens comprising a magnetic structure, a winding for establishing a magnetic field in said structure, two pairs of magnetic pole pieces associated with and disposed in the field of said structure and having axially aligned effectively equal apertures therein for an electron beam passed therethrough, means differently spacing the pole pieces of each of said pair of pole pieces to provide a first magnetic lens of substantially unity power and a second magnetic lens of relatively high magnification, and means for supporting a microspecimen substantially at the object plane of said first lens whereby said second lens enlarges the image of said specimen provided by said first lens.

12. A compound electron objective lens comprising a magnetic structure, a winding for establishing a magnetic field in said structure, two pairs of magnetic pole pieces associated with and serially disposed in the magnetic field of said structure and having axially aligned effectively equal apertures therein for an electron beam passed therethrough, separate non-magnetic means differently spacing the pole pieces of each of said pair of pole pieces and separating said pairs of pole pieces to provide a first magnetic lens of substantially unity power and a second magnetic lens of relatively high magnification, and means for supporting a microspecimen substantially at the focus of said first lens, the separation of said lenses being such that said second lens enlarges the image of said specimen provided by said first lens.

13. A compound electromagnetic objective lens comprising a magnetic structure, a winding for establishing a magnetic field in said structure, a plurality of pairs of magnetic pole pieces having serially disposed air gaps and axially aligned effectively equal central apertures for an electron beam passed therethrough, means associating said pole pieces with said magnetic structure, separating means for each of said pairs of pole pieces establishing a first lens of substantially unitary magnification and a second lens of substantially higher magnification, means for supporting a microspecimen substantially at the focus of said first lens to provide an enlarged image of said microspecimen from said second lens, and means for energizing said winding to control simultaneously the power of both of said lenses.

14. A compound electromagnetic objective lens comprising a toroidal magnetic structure, a winding enclosed within said structure for establishing a magnetic field in said structure, a plurality of pairs of magnetic pole pieces having serially disposed air gaps and axailly aligned effectively equal central apertures for an electron beam passed therethrough, means associating said pole pieces within said magnetic structure, non-magnetic separating means for each of said pairs of pole pieces establishing a first lens of substantially unitary magnification and a second lens of substantially higher magnification, means for supporting a microspecimen substantially at the focus of said first lens to provide an enlarged image of said microspecimen from said second lens, and means for energizing said winding to control simultaneously the power of both of said lenses.

15. The method of providing a highly magnified image of a microspecimen comprising imaging said specimen at low magnification, providing an enlarged image of said low magnification image of said specimen, effectively equally aperturing both of said images and controlling the magnification of at least one of said images to provide a focused highly magnified image of said specimen.

16. The method of providing a highly magnified image of a microspecimen comprising imaging said specimen at low magnification, providing an enlarged image of said low magnification image of said specimen, and effectively equally aperturing both of said images to provide a focused highly magnified image of said specimen.

17. An electron lens objective system for providing highly magnified images of a microspecimen comprising a first electromagnetic lens of relatively high magnification and relatively short focal length, a second electromagnetic lens of low magnification and relatively long focal length disposed on the axis of said first lens between said microspecimen and the plane of said first lens to focus said microspecimen substantially at the object plane of said first lens, said lenses having substantially the same effective aperture, and means for simultaneously energizing said first and second lenses.

JAMES HILLIER.